P. SPORER.
FRUIT AND VEGETABLE PARER.
APPLICATION FILED APR. 10, 1920.
1,399,901.
Patented Dec. 13, 1921.
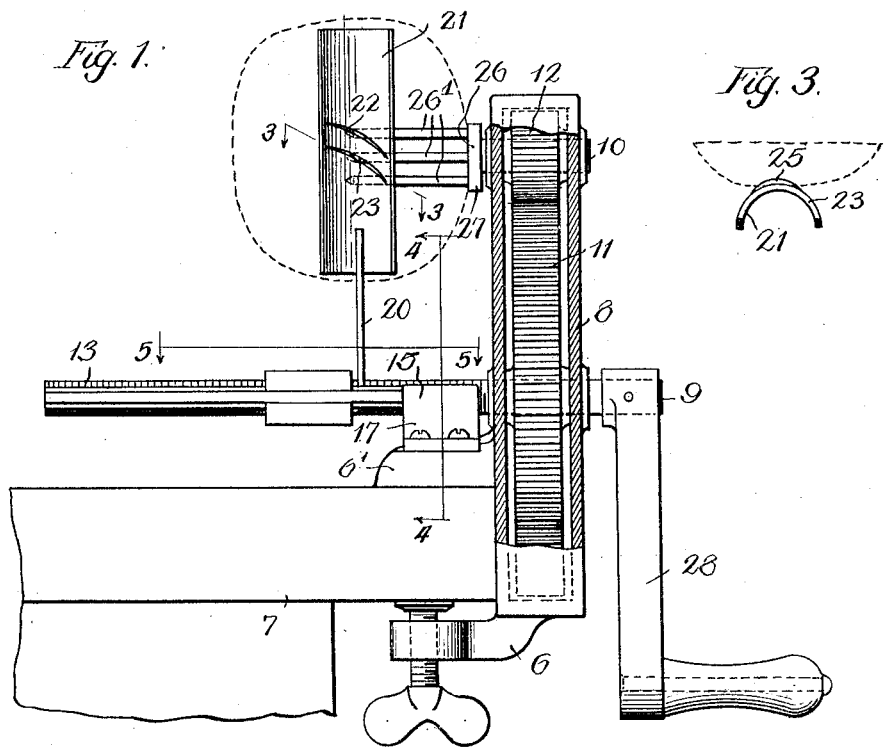
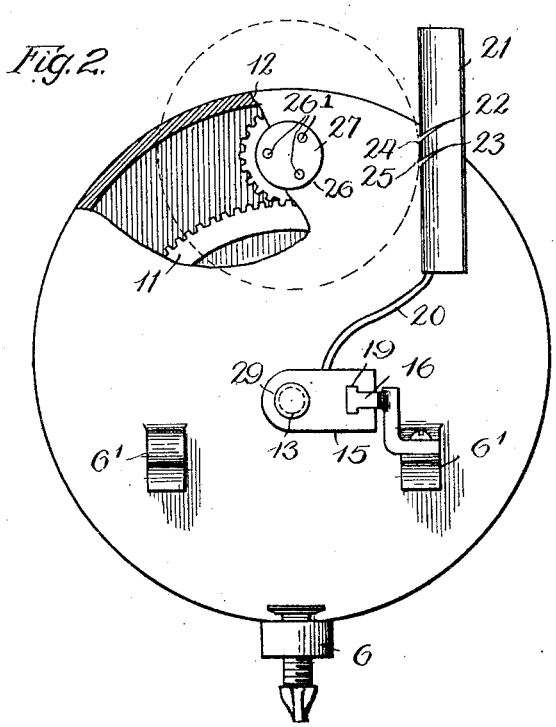
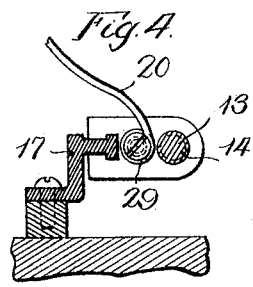
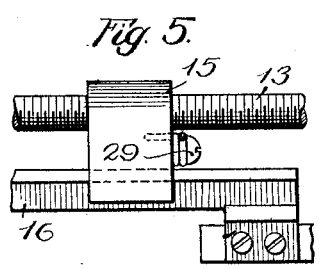
Inventor:
Paul Sporer
By Wm. F. Delaney Atty.

UNITED STATES PATENT OFFICE.

PAUL SPORER, OF CHICAGO, ILLINOIS.

FRUIT AND VEGETABLE PARER.

1,399,901.  Specification of Letters Patent.  Patented Dec. 13, 1921.

Application filed April 10, 1920. Serial No. 372,888.

*To all whom it may concern:*

Be it known that I, PAUL SPORER, a citizen of the United States, residing at Chicago, in the county of Cook and State of Illinois, have invented certain new and useful Improvements in Fruit and Vegetable Parers, of which the following is a specification.

This invention relates to devices for paring or peeling fruits and vegetables and has for its object to provide a simple and efficient article which can be manufactured at a very small cost, thus making it available for household purposes. The device is preferably intended to be clamped on a table or other suitable support and no skill whatever is required in the operation of the same.

In the selected embodiment of my invention shown in the drawing:

Figure 1 is a side elevation of the invention complete.

Fig. 2 is an end elevation.

Fig. 3 is a sectional view of the cutter member on the line 3—3 of Fig. 1.

Fig. 4 is a section on the line 4—4 of Fig. 1.

Fig. 5 is a horizontal section on the line 5—5 of Fig. 1.

Referring to the drawings, a clamping member 6 is provided to coöperate with lugs 6' to grip a table 7 or other suitable support. On this clamping member is a casing 8 in which are mounted the shafts 9 and 10 in suitable bearings provided for the purpose. On these shafts 9 and 10 are respectively secured the intermeshing driving gears 11 and 12. The projecting portion 13 of the shaft 9 is preferably threaded and this portion passes through the tapped hole 14 in the carrier 15. A guide bar 16 is mounted on the bracket 17 secured to lug 6 on the clamping member 6 and this guide bar is adapted to fit within the T shaped channel 19 in the carrier 15 to permit said carrier to slide longitudinally thereon.

Projecting upwardly from this carrier 15 is the arm 20 on the upper extremity of which is mounted the cutter member 21. This cutter member in the present embodiment is formed with a convex face having slits 22 and 23 cut therein to form the cutting edges 24 and 25.

On the inner extremity of the shaft 10 is formed the vegetable or fruit holder 26 here comprising three projecting prongs 26' set in the head 27. The article to be operated upon indicated in broken lines in the drawings, is forced on the prongs and rotated with the holder. The holder 26 may be rotated in either direction by means of the handle 28 acting through the medium of the shafts 9 and 10 and gears 11 and 12. Such rotation of the shaft 10 causes a corresponding travel of the carrier 15 longitudinally thereof.

In the present embodiment of the invention, the arm is constructed of spring metal having its lower extremity wound around the stud screw 29 and so positioned that the arm presses the cutter member 21 toward the axis of the shaft 10, thus causing such cutter member to press firmly against the article on the holder and to follow the contour thereof.

By forming the cutter member with a convex face, as shown, this member will operate on the curved surface of the article from a position adjacent the head 27 to a corresponding position at the end of the article during the travel of the cutter member.

In the operation of the device, the cutter member can start from either the inner or the outer end of the article, the handle being turned in the proper way to cause the carrier to travel past the article. Upon the completion of one paring operation, it is only necessary to remove the article from the holder, leaving the cutter member where it stopped at the completion of the previous operation, place a new article on such holder, and start paring the same. When the holder with the article thereon is rotating with its side toward the cutter member moving downwardly, the cutting edge 24 will operate whereas in the reverse movement the cutting edge 25 will operate.

I am aware that changes in the form and proportion and arrangement of parts of my invention may be made without departing from the spirit or sacrificing the advantages thereof and I therefore reserve the right to make all such changes as fairly fall within the scope of the following claims.

I claim:

1. In a device of the class described, a revoluble holder, a threaded shaft having its axis substantially parallel with the axis of revolution of said holder, a carrier provided with a tapped hole to receive and coact with said threaded shaft whereby revolution of said shaft shall cause a movement of said carrier longitudinally thereof in either direction depending upon the direction of such revolution, means for actuating said holder and said shaft, and a cutter member yieldingly mounted on said carrier to engage an article on said holder and constructed to cut during the movement of the carrier in either direction.

2. In a device of the class described, a revoluble holder, a cutter member movable relative to said holder in opposite directions and constructed to cut during movement in either direction, said cutter member being formed with a convex operating face, means for actuating said holder, and means for yieldingly moving said cutter member toward the axis of said holder.

3. In a device of the class described, a revoluble holder, a cutter member movable relative thereto and having a convex operating face provided with slits therein to form cutting edges disposed to cut during movement of the cutter member in opposite directions, and means for actuating said holder and said cutter member.

4. In a device of the class described, a carrier movable relative thereto, a cutter mounted on said carrier and having a convex face with slits therein, certain edges of said slits being bent outwardly to form cutting edges disposed to cut during movement of the cutter member in opposite directions, means for actuating said holder, and means for actuating said carrier.

5. In a device of the class described, the combination of a revoluble holder adapted to hold the articles to be operated upon, and a cutter member having oppositely directed cutting edges disposed at an angle to the direction of travel of said article.

6. In a device of the class described, the combination of a revoluble holder adapted to hold the article to be operated upon, and a cutter member having a convex operating face provided with a cutting edge disposed at an angle to the direction of travel of said article.

7. In a device of the class described, the combination of a revoluble holder adapted to hold the article to be operated upon, and a cutter member having a convex operating face provided with oppositely directed cutting edges disposed at an angle to the direction of travel of said article.

PAUL SPORER.

Witnesses:
 OTTO ROSENFELD,
 WM. F. BELT.